United States Patent [19]

Durand

[11] 4,136,232
[45] Jan. 23, 1979

[54] ELECTROCHEMICAL GENERATORS WITH AUXILIARY CATHODE

[75] Inventor: Pierre Durand, Clermont-Ferrand, France

[73] Assignee: Compagnie Generale des Etablissements Michelin, Clermont-Ferrand, France

[21] Appl. No.: 821,774

[22] Filed: Aug. 4, 1977

[30] Foreign Application Priority Data

Aug. 6, 1976 [FR] France .................................. 51-24468

[51] Int. Cl.² .............................................. H01M 8/00
[52] U.S. Cl. ........................................ 429/15; 429/18; 429/27
[58] Field of Search ....................... 429/13, 14, 15, 27, 429/12, 18

[56] References Cited

U.S. PATENT DOCUMENTS 4,038,458  7/1977  Jacquelin .............................. 429/15

Primary Examiner—Donald L. Walton
Attorney, Agent, or Firm—Brumbaugh, Graves, Donohue & Raymond

[57] ABSTRACT

In an electrochemical generator having two cells, the anode collector of a first of the cells is connected electrically to the cathode of the second cell. The generator comprises means for creating, through the anode compartments of the cells, a flow, in series, of a liquid electrolyte containing particles formed of an anode-active metal and is characterized in that the cathode compartment of the second cell comprises an auxiliary cathode capable of creating electric current lines localized substantially at one end of the anode collector of the second cell, such end being hydraulically the closest to the anode collector of the first cell.

17 Claims, 7 Drawing Figures

ELECTROCHEMICAL GENERATORS WITH AUXILIARY CATHODE

BACKGROUND OF THE INVENTION

This invention relates to electric current generators and, more particularly, to such generators operating by electrochemical oxidation and comprising at least one cell with an anode compartment and a cathode compartment, or several of such compartments. The invention relates also to a novel and highly-effective process utilizing such generators.

The invention concerns, in particular, generators in which the active material of the anode compartment, sometimes called fuel, is a metal referred to as an anode-active metal, this anode-active metal undergoing electrochemical oxidation in the anode compartment with loss of electrons when the generator supplies electric current to a discharge circuit.

The invention relates, more particularly, to generators whose anode compartment contains a liquid electrolyte in which particles of anode-active metal are present, the electrolyte and the particles being in movement. The electrons lost by the anode-active material during the discharge are then collected in the anode compartment by an electrically conductive member, called the anode collector.

By active metal particles of the anode compartment there are understood particles formed, in whole or in part, of anode-active material, for instance particles whose electrochemically inactive center is covered with a covering formed by anode-active material.

Such an anode compartment is electrochemically associated with a cathode compartment comprising a cathode having a cathode-active material which is reduced by electrons corresponding to the negative charges liberated in the anode compartment during the discharge of the generator, the electric charges necessary for the electrochemical reaction in the cathode being delivered by an electrically conductive member called the cathode collector.

In order to produce generators of relatively high electric power, such generators being intended for instance for the traction of electric vehicles, at least two cells are combined with each other.

The feeding, in hydraulic series, of these cells with the electrolyte containing the active particles permits, in particular, a substantial simplification of the circulation devices, these cells being furthermore connected in electrical series so as to increase the electric voltage at the terminals of the generators.

The anode compartment of one cell, called the first cell, is thus connected to the cathode of the following cell, called the second cell, by an electric conductor of low resistance, the electrical connections being effected by the anode and cathode collectors. The one of these two cells which is first traversed by the electrolyte and the particles is called the upstream cell, the other cell being called the downstream cell, in which connection the upstream cell may be either the first cell or the second cell.

Each anode collector comprises an upstream end and a downstream end with reference to the average direction of the flow of the electrolyte and the particles in the anode compartment in which it is contained. When n identical cells are combined in this manner, one aims at obtaining a generator whose voltage V at the terminals is equal to nv, v being the voltage at the terminals of an isolated cell, and whose electrical power W is equal to nw, w being the electric power of each isolated cell.

In conventional practice, this arrangement results in the following drawbacks:

The placing in electric series gives rise to a short-circuit current for each electric unit, referred to as a hybrid generator, formed of the anode collector of the first cell, the cathode of the second cell, and the electrolyte in contact with this anode collector and this cathode. Such a short-circuit current causes a deposition of anode-active metal at one end of the anode collector of the second cell, this end being hydraulically the closest to the anode collector of the first cell. The expression "hydraulically closest end" means that the path along the electrolyte from said end to the anode collector of the first cell is shorter than the path along the electrolyte from the other end of this same anode collector of the second cell to the anode collector of the first cell, the path along the electrolyte being measured in the direction of flow when the first cell is the downstream cell and in the direction opposite the flow when the first cell is the upstream cell.

The end where this deposition of anode-active metal takes place is therefore an upstream end when the first cell is the upstream cell and a downstream end in the opposite case. The deposit of metal which is produced even when the generator is not delivering current increases progressively and leads, on the one hand, to an obstructing of the anode compartments of the generator which makes the circulation of the electrolyte and particles impossible and, on the other hand, to a short-circuit between the anode collectors of two cells arranged one behind the other by the anode-active metal thus deposited. The generator then rapidly becomes unusable.

SUMMARY OF THE INVENTION

An object of the present invention is to provide a generator which is free of the drawbacks indicated above.

The foregoing and other objects are attained in accordance with the invention by providing an electrochemical generator which has at least two cells, each of the two cells having, on the one hand, at least one anode compartment with at least one anode collector and, on the other hand, at least one cathode having a cathode-active material, the anode collector of one of the two cells, called the first cell, being electrically connected to the cathode of the other cell, called the second cell. The generator comprises means for creating, through the anode compartments of the two cells, a flow in series of a liquid electrolyte containing particles formed at least in part of an anode-active metal, the one of the two cells traversed first by the flow being called the upstream cell and the other being called the downstream cell, the anode collector of each of the two cells comprising two ends, one located upstream and the other downstream with respect to the average direction of flow in the anode compartment in which it is located. In accordance with the invention, the second cell comprises, in addition to the cathode, called the main cathode, at least one auxiliary cathode capable of generating electric current lines that are substantially focused on one end of the anode collector of the second cell, such end being hydraulically the closest to the anode collector of the first cell. The invention also applies to processes utilizing the generator.

BRIEF DESCRIPTION OF THE DRAWINGS

A better understanding of the invention may be gained from the following detailed description of the preferred embodiments thereof in conjunction with the appended figures of the drawings, wherein.

DESCRIPTION OF THE PREFERRED EMBODIMENTS

Figure 1:
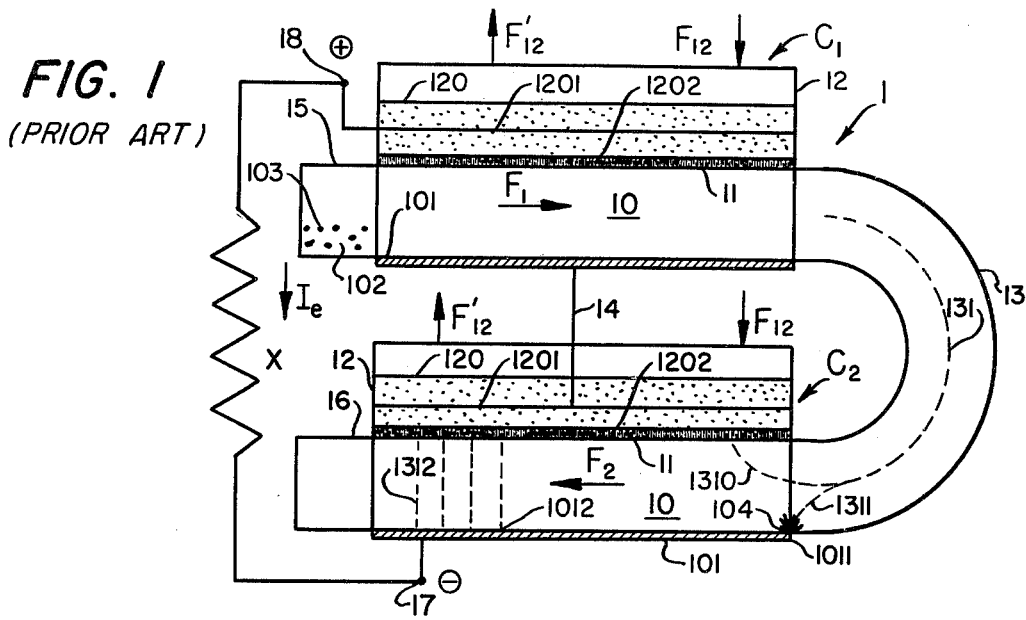
FIG. 1 shows diagrammatically a conventional generator having two cells seen in section along a plane parallel to the average directions of flow in the two cells, these cells being in hydraulic and electric series, the first cell being the upstream cell.
Figure 7:
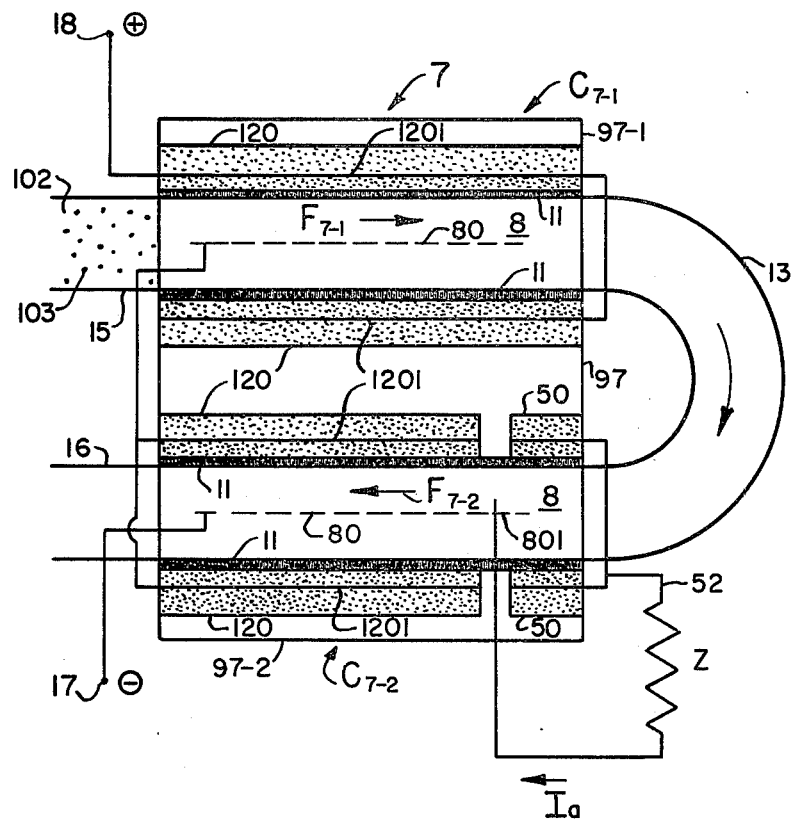

For the clarity of the drawing, the particles have been shown only in a part of FIGS. 1 and 7, and they have not been shown in the other figures.

FIG. 1 shows an electrochemical generator 1 having two identical cells $C_1$ and $C_2$. Each cell $C_1$ and $C_2$ has an anode compartment 10 and a cathode compartment 12.

The anode compartment 10 comprises an anode collector 101 of substantially flat shape. Within the cathode compartment 12 there can be noted the cathode 120, comprising a cathode collector 1201. The cathode 120 is covered on its substantially flat face 1202 directed towards the anode collector 101 of the same cell by a porous separator 11 which is a non-conductor of electrons.

The upstream cell $C_1$ comprises a feed device 15 which makes it possible to introduce a liquid electrolyte 102 containing particles 103 of an anode-active metal into the anode compartment 10 of the cell. A connecting conduit 13 connects the compartments 10 of the cells $C_1$ and $C_2$ hydraulically together in series, the evacuation device 16 of the downstream cell $C_2$ permitting the evacuation from the cell of the electrolyte 102 and the particles 103 which have not been completely consumed during their passage within the generator 1. In the upstream cell $C_1$, the average direction of flow of the electrolyte 102 containing particles 103 is indicated by the arrow $F_1$. Similarly, in the downstream cell $C_2$, the average direction of the electrolyte 102 containing particles 103 is directed along the arrow $F_2$. The flow in each cell $C_1$ and $C_2$ takes place between the anode collector 101 and the separator 11, the anode collector 101 being impermeable to the electrolyte 102 and the particles 103, and the separator 11 being permeable to the electrolyte 102 and impermeable to the particles 103. A device 19 outside the cells $C_1$ and $C_2$, for example a pump, permits the circulating of the electrolyte 102 and the particles 103 through the cells $C_1$ and $C_2$ and the recycling of the electrolyte 102 and the particles 103 from the evacuation device 16 to the feed device 15, via an installation 20 outside the cells $C_1$ and $C_2$. This installation 20 comprises a feed device 201 which makes it possible to maintain the percentage by weight of anode-active metal in the electrolyte constant and a surge reservoir 202 of suitable volume.

The anode collector 101 of the cell $C_1$, called the first cell, is connected electrically in series with the cathode 120 of the cell $C_2$, called the second cell, by an electric conductor 14 of low resistance, the connection being effected between the conductor 14 and the cathode collector 1201 of the second cell $C_2$.

The cathode collector 1201 of the first cell $C_1$ is connected to the positive terminal 18 of the generator 1. The anode collector 101 of the second cell $C_2$ is connected to the negative terminal 17 of the generator 1. Upon their contacts with the anode collectors 101 during their passage within the generator 1, the particles 103 become oxidized, losing electrons, while the active material of the cathode 120 is reduced by the electrons coming from the discharge circuit symbolized by the resistor X connected to the terminals 17 and 18 of the generator, the intensity of the discharge current being indicated as $I_e$.

By way of illustration and not of limitation, the anode particles 103 are particles of zinc, the electrolyte 102 is an alkaline aqueous electrolyte, the cathodes 120 are air or oxygen diffusion electrodes formed in a conventional manner and essentially of carbon, silver, nickel, and polytetrafluorethylene, oxygen being the cathode-active material, the entrance and departure of air into and from each cathode compartment 12 being schematically indicated by the arrows F12 and F'12. The operating conditions are for instance as follows:

electrolyte: 4 to 12 N potassium hydroxide solution (4 to 12 mols of potassium hydroxide per liter)

average size of the zinc particles introduced into the electrolyte: 10–20 microns percentage by weight of zinc in the electrolyte: 20–30% of the weight of the electrolyte speed of circulation of the electrolyte in the anode compartments: from 10 m/minute to 30 m/minute density of the discharge current: 150 mA per $cm^2$ of active surface 1202 of each air electrode 120.

The concentration of oxidized zinc dissolved in the form of potassium zincate in the electrolyte is maintained less than a predetermined value, equal for instance to about 120 g/liter when the electrolyte is 6 N potassium hydroxide solution, so that the particles of zinc are not made inactive by an accumulation of the reaction products on their surface or near their surface.

Figure 2:
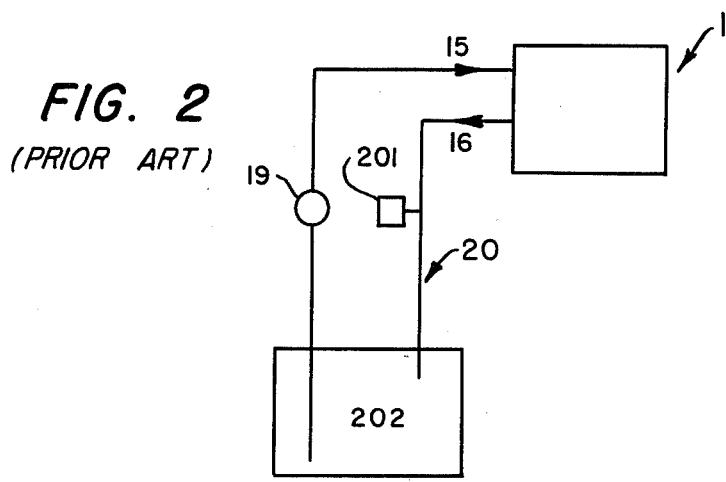
FIG. 2 shows diagrammatically a circuit which makes it possible to cause an electrolyte containing particles to circulate in the generators shown in FIGS. 1, 3, 4, 5, 6 and 7.

This result can be obtained either by replacing the zincated electrolyte when its concentration of dissolved zinc becomes excessive by a fresh solution of potassium hydroxide which is free of zincate, or by continuously regenerating the zincated electrolyte by means not shown in FIG. 2.

The voltage of the generator 1, at the start of the discharge, between the terminals 17 and 18, is of the order of 2 volts, namely substantially twice the voltage of each individual cell $C_1$ and $C_2$, the power of the generator 1 being thus on the order of 100 watts.

During the operation of the generator, the end 1011 of the collector 101 of the second cell $C_2$ becomes covered gradually with a deposit 104 of zinc, this end 1011 being hydraulically the closest to the anode collector 101 of the first cell $C_1$, that is to say it is the upstream end of the anode collector 101 of the second cell $C_2$. The deposit 104 gradually increases and causes obstruction of the connecting conduit 13. This obstruction propagates itself within the anode compartments 10 of the cells $C_1$ and $C_2$ in such a manner that the circulation of the electrolyte and the particles can no longer take place and that the anode compartment 10 and cathode compartment 12 of the second cell $C_2$ are electrically short-circuited as a result of an electric connection between the anode collectors 101 of the cells $C_1$ and $C_2$ via agglomerated zinc particles. The generator 1 therefore rapidly becomes unusable.

Figure 3:
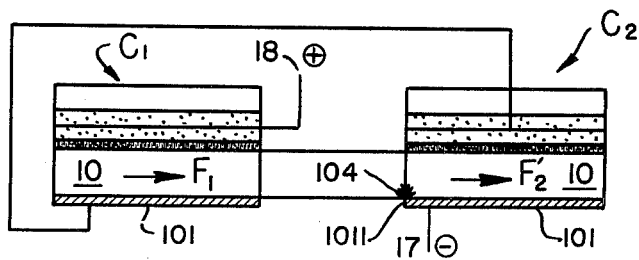
FIG. 3 shows diagrammatically another conventional generator comprising two cells seen in section along a plane parallel to the average directions of flow in the two cells, these cells being in hydraulic and electric series, the first cell being the upstream cell.

The average directions of flow in the anode compartments 10 of the cells $C_1$ and $C_2$ have been shown opposite in FIG. 1, these directions of flow being oriented along the arrow $F_1$ in the case of the upstream cell $C_1$ and along the arrow $F_2$ in the case of the downstream cell $C_2$. The drawbacks described previously are present however whatever the average directions of flow in the cells $C_1$ and $C_2$. FIG. 3, for example, shows the two cells $C_1$ and $C_2$ which were previously described, assembled electrically and hydraulically in series in such a manner that the average direction of flow, oriented along the arrow $F_1$ within the anode compartment 10 of the upstream cell $C_1$, is substantially parallel to the average direction of flow, oriented along the arrow $F'_2$ in the anode compartment 10 of the downstream cell $C_2$.

The deposit of zinc 104 is still formed on the upstream end 1011 of the anode collector 101 of the second cell $C_2$.

Figure 4:
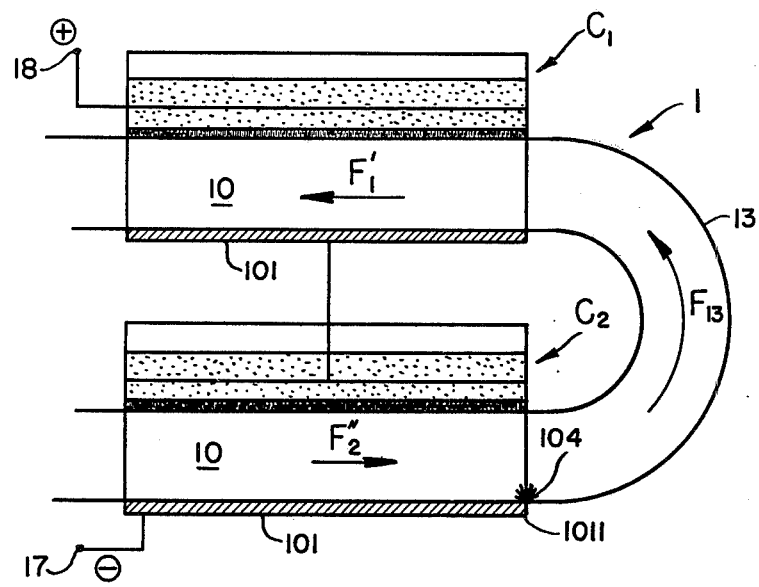
FIG. 4 shows diagrammatically the generator of FIG. 1 in the same sectional view, but the first cell here being the downstream cell.

If the direction of circulation of the electrolyte containing the particles is reversed so that the first cell $C_1$ becomes the downstream cell, as shown in FIG. 4, it is found that the phenomena described are further aggravated by the fact that the end 1011 of the anode collector 101 of the second cell $C_2$, where the deposit 104 is produced, is the downstream end so that the deposit 104 is entrained by the electrolyte 102 in the direction towards the first cell $C_1$, as indicated by the arrow $F_{13}$, which represents the orientation of the average direction of flow in the connecting conduit 13. There follows from this an even faster short-circuiting than previously between the anode collectors 101 of the cells $C_1$ and $C_2$, this short-circuiting possibly taking place before the anode compartments have become obstructed.

The explanation of the phenomena described above is probably the following.

The collector 101 of the first cell $C_1$ and the cathode 120 of the second cell $C_2$ constitute a hybrid generator, electrically short-circuited by the conductor 14.

This short-circuiting causes the formation of a short-circuit current $I_{sc}$ on the order of 300 mA in the electrolyte contained in the connecting conduit 13. Lines of electric current 131 are then established, one of which is shown in dashed line in FIG. 1.

These current lines 131 debouch into the anode compartment 10 of the second cell $C_2$. The electrical resistance of the anode collector 101 of this second cell being infinitesimal as compared with the ionic electrical resistance of the electrolyte, the short-circuit current is then divided in two.

A small part, indicated diagrammatically by the dashed line 1310, passes directly into the cathode 120 of the cell $C_2$, while the major part, indicated diagrammatically by the dashed line 1311, passes into the anode collector 101 of the second cell $C_2$ and is then distributed over the entire cathode 120 of the cell as indicated by dashed lines 1312. At the point where the short-circuit current line or lines $I_{sc}$ pass from the electrolyte 102 to the anode collector 101 of the second cell $C_2$, that is to say essentially at the end 1011 of this collector, there is reduction of the potassium zincate, this reduction giving rise to the deposit 104 of metallic zinc. At the points 1012 where the current lines 1312 leave the anode collector 101, there is on the other hand dissolution of the zinc in the form of potassium zincate. The deposit 104 is a compact zinc deposit which it is difficult for the circulating electrolyte 102 to tear away. This deposit 104 stops the particles of zinc in circulation and causes the drawbacks described previously.

When the electrolyte 102 and the particles 103 are circulated within the generator 1 without the latter delivering current, the same phenomena of deposition, obstruction, and short-circuiting of the anode collectors are however noted. That is because the short-circuit current $I_{sc}$ continues to exist, even when the intensity $I_e$ of the discharge current is zero.

Figure 5:
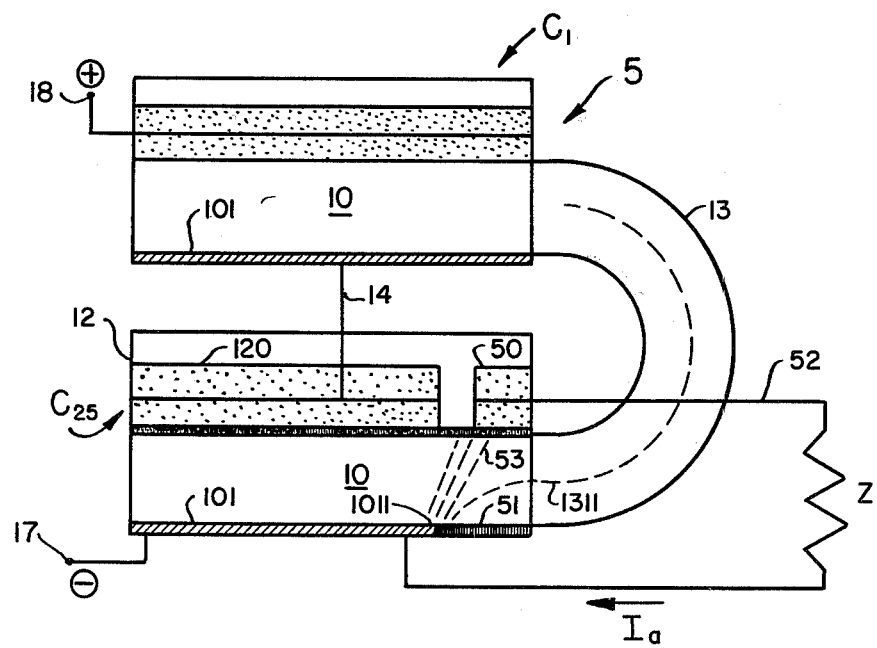
FIGS. 5, 6, and 7 respectively show diagrammatically different embodiments of generators in accordance with the invention comprising two cells, the views being in section along a plane parallel to the average directions of flow in the two cells.

FIG. 5 shows a generator 5 in accordance with the invention which eliminates these drawbacks. The generator 5 has a first cell $C_1$ identical to the cell $C_1$ shown in FIGS. 1, 3 and 4, and a second cell $C_{25}$ identical to cell $C_1$, except for the following modifications. The cathode compartment 12 of this second cell has, in addition to the electrode 120 previously described and referred to as the main cathode, another cathode 50, referred to as the auxiliary cathode, arranged opposite an electrically non-conductive element 51 which extends the collector 101 of the second cell $C_{25}$ beyond the end 1011 of the collector which is located hydraulically closest to the anode collector 101 of the first cell $C_1$. This auxiliary cathode 50 is insulated electrically from the main cathode 120 and is connected electrically to the anode collector 101 of the second cell $C_{25}$ by an electric circuit 52, referred to as the guard circuit, having an impedance Z, due for instance to a resistor, such that the intensity $I_a$ of the electric current, referred to as the guard current, passing within the circuit 52 is equal to or greater than, and preferably equal to, the short-circuit current $I_{sc}$ previously defined. The types and/or constitutions of the cathodes 50 and 120 may either be the same or differ.

The cells $C_1$ and $C_{25}$ are placed hydraulically in series by a connecting conduit 13 in a manner similar to any of the arrangements described above with reference to FIGS. 1, 3, and 4, the recirculation of the electrolyte 102 and of the particles 103 (not shown) taking place due to the device 19 of the installation 20 (shown in FIG. 2 but not in FIG. 5). The structure of the cell $C_{25}$ gives rise to electric current lines 53 between the anode collector 101 of the cell and the auxiliary cathode 50, these current lines being substantially focused on the end 1011 of the anode collector, so that the entire anode metal deposited at the end 1011, as a result of the current lines 1311 previously discussed, is immediately redissolved in the electrolyte. By way of example, when the generator 5 is used continuously as generator of the zinc/air type, with the operating conditions described above, no deposit 104 is noted and therefore no short-circuiting of the anode collectors 101 and no clogging of the anode compartments 10. This result is obtained without substantial loss of power of the generator, for a consumption of zinc equal to that of a generator otherwise the same but lacking an auxiliary cathode.

Furthermore, the use of the auxiliary cathode 50 avoids the drawbacks of deposit, clogging, and short-circuiting of the anode collectors, even when the generator does not deliver a discharge current.

Figure 6:
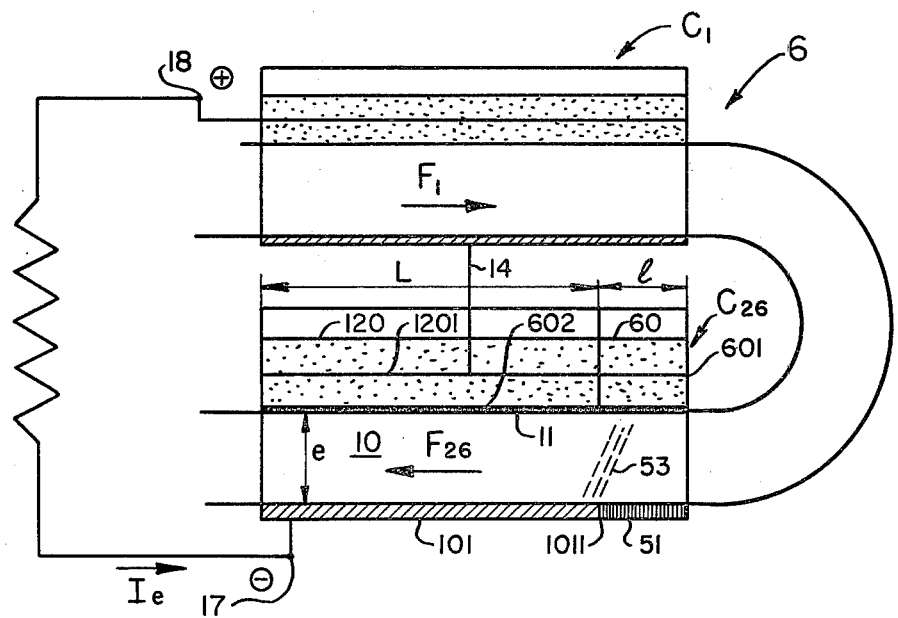

FIG. 6 shows another generator 6 in accordance with the invention. The generator 6 differs from the generator 5 in that the second cell $C_{26}$ comprises an auxiliary electrode 60 formed by an extension of the main cathode 120, i.e., electrically connected to the main cathode, the other component elements of the second cell $C_{26}$ being identical in their structure and arrangement to those of the second cell $C_{25}$. The auxiliary cathode 60 is arranged substantially facing the non-conductive element 51.

The auxiliary electrode 60 and the main electrode 120 are then connected electrically to the anode collector 101 of the first cell $C_1$ by the conductor 14, the collector 601 of the auxiliary cathode 60 extending the collector 1201 of the main cathode 120 of the second cell. The auxiliary cathode 60 and the main cathode 120 have thus been connected in parallel, both of them discharging into the discharge circuit of the generator, the fraction $I_a$ of the total discharge current $I_e$ corresponding to the guard current, that is to say to the current lines 53 between the end 1011 of the anode collector 101 of the second cell $C_{26}$ and the auxiliary cathode 60. It is therefore no longer necessary to provide an auxiliary impedance as in the generator 5, which simplifies the construction of the generators in accordance with the invention, particularly when these generators have a relatively high number of cells in hydraulic and electric series. However, since the guard current $I_a$ is a fraction of the discharge current $I_e$, the provision of the generator 6 definitely avoids the drawbacks described above only if the discharge intensity $I_e$ is greater than a minimum discharge intensity $I_{em}$.

The intensity $I_{sc}$ of the short-circuit current and the minimum discharge intensity are related by the equation $l/L = A(I_{sc}/I_{em})$, l being the length of the auxiliary cathode 60, L being the length of the main cathode 120, and l and L being measured parallel to the average direction of flow within the anode compartment 10 of the cell $C_{26}$, the average direction being indicated by the arrow $F_{26}$, and A being a coefficient which depends on the shape of the cell $C_{26}$ and the cathode current density. For example, for a distance e between the anode collector 101 and the main cathode 120, within cell $C_{26}$, of between 1 and 3 mm, a current density varying between 100 and 200 mA per cm$^2$ of active surface of the assembly formed by the main cathode 120 and the auxiliary cathode 60, this surface corresponding to the common face 602 of these cathodes which is applied against the separator 11, a short-circuit intensity $I_{sc}$ of between 200 and 400 mA, a minimum discharge intensity $I_{em}$ equal to 5 Amperes, and a length L of between 300 and 500 mm, the coefficient A is close to 1.1, that is to say the ratio l/L varies substantially between 0.04 and 0.10.

The minimum discharge current ($I_{em}$) may for instance be the minimum current with the battery and its auxiliaries (pumps and ventilators in particular) in operation but without the external load, that is to say without the electric traction motor if the battery is mounted on an electric vehicle.

In order to limit the formation of the deposit 104 even when the generator delivers a discharge intensity less than $I_{em}$ or when it does not deliver current, the circulation of electrolyte and particles being maintained, the cell $C_{26}$ is preferably arranged downstream of the first cell $C_1$, as shown in FIG. 6.

The invention is not limited to the arrangement of the anode collectors previously described. Moreover, the second cell may contain more than one auxiliary cathode, without thereby going beyond the scope of the invention.

FIG. 7 shows an electrochemical generator 7 having two cells C 7-1 and C 7-2 connected in hydraulic series by the connecting conduit 13. Each cell C 7-1 and C 7-2 comprises an anode compartment 8 in which an anode collector 80 is provided. Each anode collector 80 has, for instance, the shape of a generally flat grid arranged between the two separators 11 of each cell C 7-1, C 7-2, at an equal distance from the separators. These separators 11 are permeable to the electrolyte 102, impermeable to the particles 103, and of substantially flat shape. This arrangement is of course not limitative, and the anode collector 80 may, for instance, be a plate arranged between the separators 11. The anode collectors 80 are, for instance, fastened to the side walls (not shown) of the cells C 7-1 and C 7-2, these side walls being arranged in each compartment 8 between the separators 11. The electrolyte 102 and the particles 103 flow in each anode compartment 8 between the anode collector 80 and each of the separators 11, which thus constitute two parallel opposite faces of this compartment, the average directions of flow in the compartments 8 being parallel to the arrows F 7-1 and F 7-2.

The cell C 7-1 is, for instance, both the upstream cell and the first cell. Each anode compartment 8 is ionically connected by the separators 11 with two main cathodes 120. The two cathodes 120 arranged between the two anode compartments 8 form, for instance, part of a cathode compartment 97 common to the cells C 7-1 and C 7-2, the gases being capable possibly of flowing between the two cathodes 120 of the compartment 97 if the cathodes 120 are gas-diffusion electrodes. The other cathodes 120 are part of the cathode compartment 97-1 in the case of the cell C 7-1, and the cathode compartment 97-2 in the case of the cell C 7-2. The cathodes 120 which are ionically associated with the anode compartment 8 of the first cell C 7-1 are, for instance, electrically connected to each other and to the positive terminal 18 of the generator 7. The main cathodes 120 ionically associated with the anode compartment 8 of the second cell C 7-2 are, for instance, electrically connected to each other and to the anode collector 80 of the first cell C 7-1.

The anode collector 80 of the second cell C 7-2 is electrically connected to a negative terminal 17 of the generator 7.

The second cell C 7-2 comprises two auxiliary cathodes 50, each of which is identical to the auxiliary cathode 50 described above and shown in FIG. 5, one arranged in the cathode compartment 97 and the other in the cathode compartment 97-2. These auxiliary cathodes 50 are, for instance, connected electrically to each other and to the anode collector 80 of the second cell C 7-2 by the guard circuit 52 having an impedance Z, identical to the guard circuit 52 described above and shown in FIG. 5. These auxiliary cathodes 50 are ionically connected with the anode compartment 8 of the second cell C 7-2 by the separators 11 of that cell and make it possible to generate electric current lines (not shown) which are substantially focused on the end 801 of the anode collector 80 of the second cell C 7-2, the end 801 being hydraulically the closest to the anode collector 80 of the first cell C 7-1. The drawbacks described above are thus avoided.

Each anode compartment 8 or 10 may also comprise at least one additional anode collector (not shown) having, for instance, the form of a grid or of a perforated plate, mounted on one of the separators 11, the grid or perforated plate being permeable to the electrolyte and either permeable or impermeable to the particles 103. When such a grid or perforated plate is impermeable to the particles 103, it may itself constitute the separator 11, at least in part. Such an additional anode collector may, for instance, be mounted on each of the separators 11 of at least one of the compartments 8 in order further to increase the electronic exchanges. The anode collectors of the same anode compartment are, for instance, connected electrically to each other. The auxiliary electrodes 50, 60 serve the same purpose with respect to these additional anode collectors as that described above with reference to the anode collectors 101 and 80.

Moreover, the cathode compartments 97-1 and 97-2 may each have two main cathodes 120, in a manner similar to the cathode compartment 97, if the cells C 7-1 and C 7-2 are combined with other cells. In addition, the electrolyte 102 and the particles 103 may be recycled in the feed circuit 15 from the evacuation conduit 16 via a recycling path (not shown in FIG. 7).

As indicated previously, the particles 103 may, for instance, be particles of zinc, the electrolyte 102 may be an alkaline aqueous electrolyte, for instance an aqueous potassium hydroxide electrolyte, and the cathodes 120 and/or 50 may be air or oxygen diffusion electrodes.

The first cells $C_1$ and C 7-1 described above and shown in FIGS. 5, 6 and 7 may each have at least one auxiliary cathode in accordance with the invention if the main cathode 120 of the cell $C_1$ or C 7-1 is connected electrically to the anode collector of another cell (not shown), that is to say if the cell $C_1$ or C 7-1 serves as a second cell with respect to the other cell, or even if it does not serve as a second cell.

The invention is not limited to the embodiments which have been described above and on basis of which those skilled in the art will contemplate other methods and embodiments without thereby going beyond the scope of the invention. In particular, the invention applies to cells each having a plurality of anode compartments. The invention also applies to cells having cathodes of any nature whatever. The cathodes may, for instance, have an active material formed of at least one compound of oxygen, such as a metal oxide and particularly a silver oxide; the invention also applies whatever the number of cells in hydraulic and electrical series and whatever the shape of the generator and of its components, which shape may for instance be tubular. Accordingly, the invention is as broad as the appended claims and equivalents thereof.

I claim:

1. An electrochemical generator comprising at least two cells, each of the two cells having, on the one hand, at least one anode compartment with at least one anode collector and, on the other hand, at least a main cathode having a cathode-active material, the anode collector of a first of the two cells being connected electrically to the cathode of a second of the two cells, the generator having means for creating, through the anode compartments of the two cells, a flow in series of a liquid electrolyte containing particles formed at least in part of an anode-active metal, the one of the two cells which is traversed first by the flow being the upstream cell and the other being the downstream cell, the anode collector of each of the two cells having two ends, one located upstream and the other downstream with respect to the average direction of flow within the anode compartment in which it is contained, characterized in that the second cell comprises, in addition to said main cathode, at least one auxiliary cathode extending beyond the end of the anode collector of the second cell which is located hydraulically closest to the anode collector of the first cell, the auxiliary cathode thus giving rise to electric current lines which are substantially focused on said hydraulically closest end of the anode collector of the second cell.

2. An electrochemical generator according to claim 1, wherein the auxiliary cathode is electrically insulated from the main cathode and further comprising an electric guard circuit electrically connecting the auxiliary cathode to the anode collector of the second cell, said guard circuit comprising an impedance such that the intensity $I_a$ of the current passing within said guard circuit is at least equal to the intensity $I_{sc}$ of the short-circuit current.

3. An electrochemical generator according to claim 1, wherein the auxiliary cathode is connected electrically to the main cathode, and wherein the intensity $I_a$ of the current corresponding to said electric current lines is a fraction of the intensity $I_e$ of the total discharge current of the generator.

4. An electrochemical generator according to claim 3, wherein the auxiliary cathode extends the main cathode.

5. An electrochemical generator according to claim 3, wherein, L being the length of the main cathode, l being the length of the auxiliary cathode, l and L being measured parallel to the average direction of flow in the anode compartment of the second cell, $I_{em}$ being a predetermined minimum discharge intensity, $I_{sc}$ being the intensity of the short-circuit current, and A being a coefficient, there is the relationship $l/L = (I_{sc}/I_{em})$.

6. An electrochemical generator according to claim 5, wherein the ratio l/L is between 0.04 and 0.10.

7. An electrochemical generator according to claim 1, further comprising an electrically non-conductive element which extends one end of the anode collector of the second cell, said end being hydraulically the one closest to the anode collector of the first cell, and the auxiliary cathode being located substantially opposite said element.

8. An electrochemical generator according to claim 1, wherein the auxiliary cathode is made substantially the same as the main cathode.

9. An electrochemical generator according to claim 1, wherein the electrolyte and the particles flow within at least one anode compartment between the anode collector of said compartment and the cathode of the corresponding cell.

10. An electrochemical generator according to claim 1, wherein, within at least one anode compartment, the anode collector is arranged between two faces of said anode compartment, said anode compartment being in ionic communication with at least one cathode by at least one of these faces.

11. An electrochemical generator according to claim 10, wherein said anode compartment comprises at least one additional anode collector, said additional collector being permeable to the electrolyte and being mounted on one face of the compartment or constituting said face, at least in part.

12. An electrochemical generator according to claim 1, wherein the second cell is the downstream cell.

13. An electrochemical generator according to claim 1, further comprising a porous non-electrically conductive separator which is permeable to the electrolyte and impermeable to the particles arranged within at least one cell between the anode compartment and the cathode.

14. An electrochemical generator according to claim 1, wherein the anode-active metal is zinc.

15. An electrochemical generator according to claim 1, wherein the electrolyte is an alkaline electrolyte.

16. An electrochemical generator according to claim 1, wherein the cathode-active material comprises oxygen.

17. An electrochemical process used in an electrochemical generator according to claim 1, comprising the steps of creating electric current lines which are substantially focused on one end of the anode collector of the second cell, said end being hydraulically the closest to the anode collector of the first cell.

* * * * *

UNITED STATES PATENT OFFICE
CERTIFICATE OF CORRECTION

Patent No. 4,136,232   Dated January 23, 1979

Inventor(s) Pierre Durand

It is certified that error appears in the above-identified patent and that said Letters Patent are hereby corrected as shown below:

First page, Item [30], "51-24468" should read --76 24468-- and the following line should be added: --July 19, 1977 France 77 22487--;

Col. 10, line 39, "($I_{sc}/I_{em}$)" should read --A $I_{sc}/I_{em}$--.

Signed and Sealed this

Twenty-ninth Day of May 1979

[SEAL]

Attest:

RUTH C. MASON
Attesting Officer

DONALD W. BANNER
Commissioner of Patents and Trademarks